United States Patent [19]

Carre et al.

[11] 4,301,870
[45] Nov. 24, 1981

[54] DEVICE FOR ELECTROHYDRAULICALLY LIFTING AGRICULTURAL IMPLEMENTS

[75] Inventors: Jean C. Carre, Asnieres; Roger Maistrelli, Bougival, both of France

[73] Assignee: Regie Nationale des Usines Renault, Boulogne-Billancourt, France

[21] Appl. No.: 73,776

[22] Filed: Sep. 10, 1979

[30] Foreign Application Priority Data

Sep. 8, 1978 [FR] France .................. 78 25905

[51] Int. Cl.³ .................. A01B 63/112
[52] U.S. Cl. .................. 172/7; 91/361; 91/451
[58] Field of Search .................. 172/7, 8, 9, 10, 11, 172/12, 491; 91/361, 450, 451, 452

[56] References Cited

U.S. PATENT DOCUMENTS

| 3,025,717 | 3/1962 | Christenson | 91/451 X |
| 3,172,479 | 3/1965 | Ashfield et al. | 172/7 |
| 3,246,701 | 4/1966 | Schulz | 172/9 |
| 3,847,180 | 11/1974 | Kroth et al. | 91/451 X |
| 3,874,269 | 4/1975 | Walters | 91/451 X |
| 4,030,295 | 6/1977 | Khatti et al. | 172/7 X |

FOREIGN PATENT DOCUMENTS

| 1198103 | 4/1966 | Fed. Rep. of Germany | 172/7 |
| PV92763 | 11/1968 | France | 172/7 |
| 2171967 | 9/1973 | France | 172/7 |

Primary Examiner—Richard T. Stouffer
Attorney, Agent, or Firm—Owen, Wickersham & Erickson

[57] ABSTRACT

A device for hydraulically lifting agricultural implements by a lifting jack, utilizing a pump with constant stroke volume and a stepless distributor. A flow pressure regulator of the pump is piloted by the pressure of the lifting jack, a downstroke valve is provided for lowering the implements, and a relay valve connects to the reservoir the piloting pressure of the regulator in the downward movement of the implements. A reducing valve fed by the flow circuit of the pump feeds at least one pilot electrovalve of the stepless distributor.

8 Claims, 2 Drawing Figures

DEVICE FOR ELECTROHYDRAULICALLY LIFTING AGRICULTURAL IMPLEMENTS

This invention specifically relates to agricultural machines, and more particularly to devices for lifting tools or implements hitched to a tractor, the device being of the type allowing control of the position of the implements and control of the tractive stress.

A first device of this general type is described in U.S. Pat. No. 3,422,906 and comprises a main hydraulic distributor fed by a constant-stroke-volume pump, distributing oil under pressure to the hoisting jack or allowing oil to escape from the jack as a function of the value and the sign of (1) the deflection between the actual position of the tools and that set by the driver on a first lever, and (2) the deflection between the tractive stress on the tools and that set by the driver on a second lever. The actual and the set positions, as well as the actual and the set tractive stresses are transmitted mechanically to the main distributor to insure the desired correction. This mechanical assembly is complex and expensive, all the more so since auxiliary supplementary devices are required. In fact, in the event of incoherence between the corrections demanded of the distributor (for example, if the position control required raising the implements and the stress control required lowering the implements) priority had to be given to the correction requiring raising the implements. On the other hand, differences in the nature of terrains require a regulator valve for controlling the sensitivity of the stress control.

A second known device is described in French Pat. No. 2,171,967, owned by the assignee of the present invention, accomplishing electrohydraulic raising of the implements. For this purpose, a variable-stroke-volume pump is used, which discharges into the jack that raises the implements, and oil is allowed to escape out of the jack in order to lower them. Electric pickups measure the position of the implements and the tractive stress, and a regulator, which compares the signals of these pickups with those simulating the orders of the driver, controls the variation of stroke by the pump through a pilot jack screw and electrovalves so as to obtain the desired corrections.

Finally, a third known device is described in German Pat. No. 1,198,103. This device effects the electrohydraulic raising of implements by using a constant-stroke pump and an electrovalve which makes it possible either to place the pump in communication with the jack, or to isolate the jack so as to maintain the height of the implements, or to establish communication between the jack and the tank in order to lower the implements. An electric pickup measures the position of the implements, and another one measures that of the set lever, while an electronic regulator controls the electrovalve to maintain the desired correction. An identical assembly controls the tractive stress.

The first of these devices has the disadvantage of being too complex and too expensive. The second device, on the other hand, has the disadvantage of using a variable stroke pump, which is more expensive than pumps with a fixed stroke. One of the objects of the invention therefore is to provide electrohydraulic lifting by using a constant-stroke pump. This object has been attained by the third device, but that device has the disadvantage of using an all-or-nothing electrovalve for the jack, which is either fully open or fully closed, and thus functions in fits and starts. For this reason, another object of this invention is to obtain a progressive control like that in actual lifting by manual control, while providing electrohydraulic control by using a constant-stroke pump.

The present invention utilizes a reducing valve fed by the delivery circuit of the pump and a stepless distributor piloted by the pressure coming from the reducing valve and with the intermediary of at least one pilot electrovalve. The piloted stepless distributor is of the type having differential sections, and the relay discharge valve comprises a spring which maintains a residual pressure sufficient for feeding the reducing valve.

Other details of the invention will appear in the following description of an embodiment presented as an example and shown in the attached drawings, in which.

Figure 1:
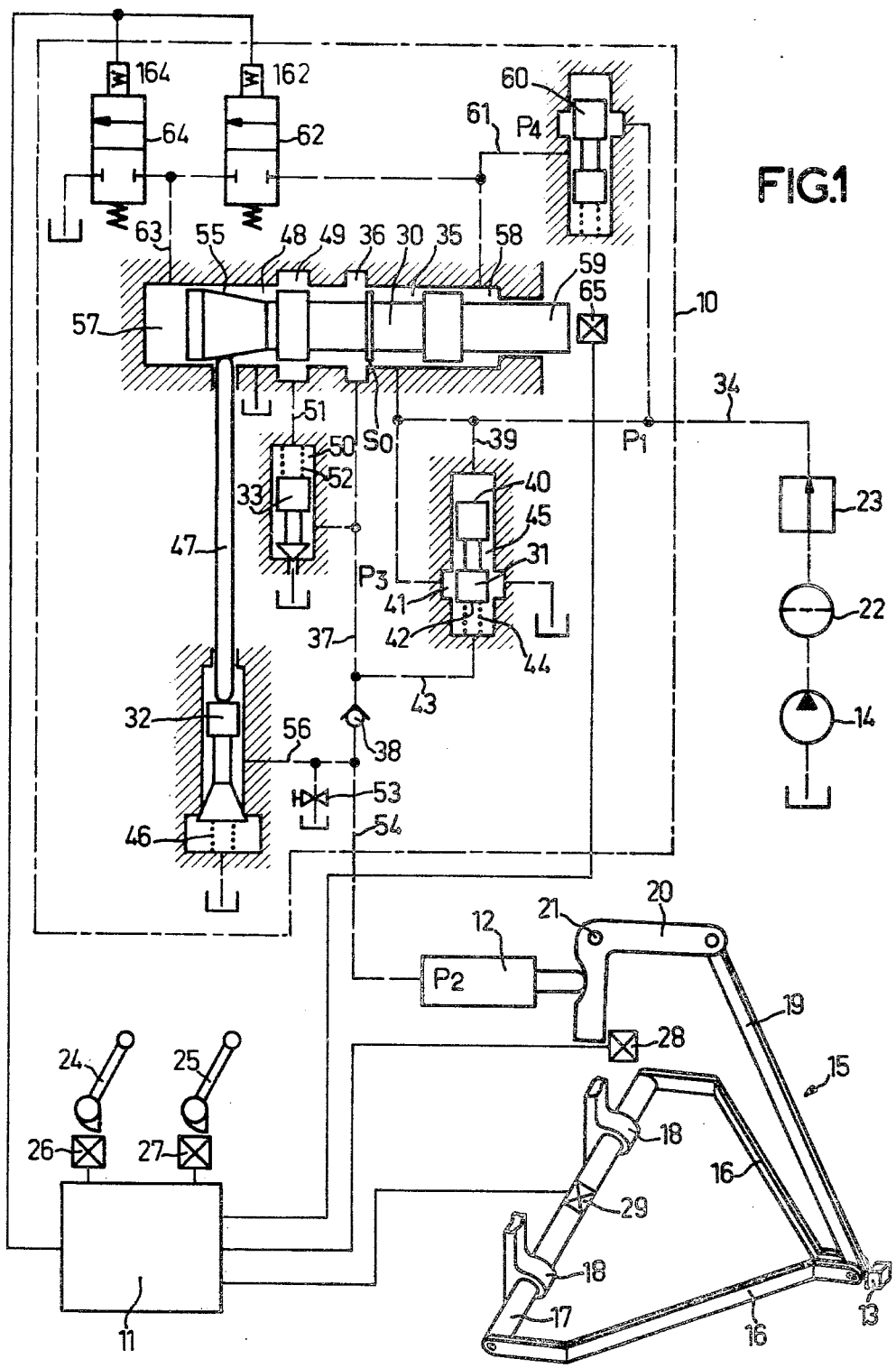
FIG. 1 is a general electrohydraulic diagram of the device.

The lifting device comprises principally a lifting distributor designated as a whole by the numeral 10, an electronic regulator 11, a jack 12 for raising implements 13, and a hydraulic pump 14 driven by a heat engine, not shown. The implements 13 are hitched on the rear portion of the tractor chassis by a classic connecting rod system 15 comprising two traction arms 16, connected by a transverse shaft 17 rotating at the rear of the chassis in two bearings 18, and a height-controlling rod 19 connected to the jack 12 through a crossbar 20 articulated around a fixed shaft 21.

The constant-stroke-volume pump 14 feeds the distributor 10 via a filter 22 and an auxiliary distributor 23 normally open for the free passage of oil.

The electronic control 11, whose functioning is described further below, receives information concerning: the position of the adjusting levers 24 and 25, respectively, the position desired for the implements and of the desired tractive stress, through the intermediary of the pickups 26 and 27, respectively, and the actual positions of the implements by a pickup 28 and of the actual tractive stress by a pickup 29.

The lifting distributor 10 comprises principally a main distributor valve 30, a pressure regulator 31, a downstroke valve 32, and a relay valve 33. These four members 30, 31, 32, 33 whose functions will be described, are identical to those existing on existing tractors. The invention relates essentially to the novel method of control of the valve 30 of the distributor.

When the valve 30 of the distributor is displaced toward the left in FIG. 1, the oil coming from the pump 14 through the passage 34 arrives in the bore 35 and flows into a chamber 36 via an area $S_o$ uncovered by the displacement. The oil then flows through a conduit 37, flows through a no-return check valve 38 disposed in said conduit and supplies the jack 12, which lifts the implement 13. The regulator 31 regulates a pressure P1 of the pump as a function of a pressure P2 prevailing in the jack 12. In effect, the pressure P1 is applied by a conduit 39 to one face 40 of the regulator valve 31 and is also sent into the chamber 41 of said regulator. A pressure P3 prevailing in the conduit 37, equal in this case to the pressure P2, is sent under another face 42 of the regulator valve 31 through a conduit 43. A spring 44 bears upon the face 42 with a pressure R1, so that, if S1 designates the cross-section of the regulator 31, the equilibrium of the latter is described by:

$$P1 = P2 + R1/S1.$$

P1 regulates itself automatically by the escape created from the chamber 41 to the bore 45 and thus toward the fluid reservoir during displacement of the regulator valve 31. In effect, if P1 increases, the valve 31 moves downward in the figure, increasing the fluid flow and thus reestablishing the equilibrium. The excess output of the pump, not utilized in the lifting jack, is thus sent back to the reservoir by the regulator 31.

It is noted that R1/S1 represents the pressure difference on each side of the section $S_o$ of passage of the distributor between the bore 35 and the chamber 36, so that a fixed movement of the valve 30 corresponds to a predetermined output in the jack 12 whatever may be the pressure P2 prevailing there.

The downstroke valve 32 is at this time closed under the action of its spring 46, since during movement of the valve 30 toward the left, the connecting rod 47 falls into the relieved portion 48.

The relay valve 33 closes the communication between the conduit 37 and the tank. During its movement to the left, the valve 30 opens communication between the chamber 36 and a chamber 49, sending the pressure P3 prevailing therein into a chamber 50 of the relay valve through a conduit 51. The pressure under the seat of the relay valve 33 being zero, this valve is closed by the least exertion of the pressure P3. A spring 52, which is provided for a reason which will be explained later, helps the closure in this case.

A manually controlled gate valve 53 connects the conduit 54 to a discharge port, in order to let the implements descend independently of the regulator 31, and this valve 53 is closed in normal operation.

When the valve 30 is moved to the right in FIG. 1, communication between the bore 35 and the chamber 36 is closed, so that the pump 14 can no longer supply the jack 12, and all its output is evacuated by the regulator 31 toward the reservoir. Further, a conical surface 55 bordering the recess 48 bears on the rod 47 which moves toward the bottom of the downstroke valve 32, thus permitting the oil from the jack 12 to escape toward the reservoir, passing through the conduits 54 and 56.

In its movement toward the right, the distributor 30 connects the chamber 49 to the reservoir by this same recess 48, thereby causing the pressure in the conduit 51 and the chamber 50 of the relay valve 33 to drop. The pressure P3 in the conduit 37 then settles at the value R2/S2, wherein R2 is the pressure of the spring 52 and S2 the area of the seat of the valve 33, which functions in this case as a discharge valve. R2 and S2 are selected so that R2/S2 is low, of the order of 5 to 10 bars, for example. In effect, this pressure serves to pilot the regulator valve 31, and the pressure P1 of the pump settles at a value of $$PIO = R2/S2 + R1/S1$$

during this phase of lowering the implement 13. It is therefore important that this value be low for reasons of energy economy and wear of the pump, but at the same time be sufficient to be able to supply the control elements of the principal distributor whose functioning will now be examined.

The principal valve distributor 30 defines at its ends, together with the body in which it slides, two chambers 57 and 58 with cross-sections S3 and S4, respectively, S4 always being smaller than S3, and preferably of the order of magnitude of S3/2, this cross-sectional area being the differential between the bore of the distributor and the cylindrical central member 59 of the valve 30.

A pressure reducing valve 60 fed by the flow pressure P1 of the pump supplies oil at a pressure P4 to the conduit 61. The latter supplies oil to the chamber 58 on the one hand and, on the other hand, to an electrovalve 62 having two positions. The output of the electrovalve 62 is connected on the one hand to the chamber 57 through the conduit 63 and, on the other hand, to the input of a second electrovalve 64 of the same type as the first one and whose output is connected to the reservoir.

It should be noted that the electrovalves 62 and 64 can be replaced by a single electrovalve having two electromagnets and three positions, insuring the same functions, as will be evident to those skilled in the art. When the electrovalve 62 is open and the electrovalve 64 is closed, the pressure P4 is transmitted to the chamber 57 and, since the cross-section of the latter is larger than that of the chamber 58, the slide valve 30 moves toward the right in the figure.

When the electrovalve 62 is closed and the electrovalve 64 is open, the chamber 57 is without pressure, while the chamber 58 is under the pressure P4, so that the slide valve 30 moves toward the left.

When both electrovalves 62 and 64 are closed, the slide valve 30 remains immobile.

Naturally, the pressure P4 regulated by the reducing valve 60 must be sufficiently great to generate control stresses on the slide valve 30 which are clearly greater than the parasitic stresses such as the reactions to the flow, the resistance of the discharge valve, and eventual sticking. Taking into account the average size of the main distributor, a dozen bars are required.

During the lifting phase of the implement 13, the reducing valve 60 can easily furnish the output pressure P4 since the pressure P1 which feeds it is always one of several dozens of bars, taking account of the weight of the machines. During the descent phase, the reducing valve is fed by the pressure $$PIO = R2/S2 + R1/S1$$

which must be greater than P4. The term R1/S1 is limited to a few bars so as to avoid raising the pressure of the pump too much above the maximum value in the lifting jack, as explained hereinabove. It is therefore necessary to tare the spring R2 of the relay valve 33 to obtain the desired P10 pressure which does not affect the maximum pressure level of the pump.

It should be noted that the level of feed pressure of the reducing valve 60 can be raised by branching it through a conduit as near to the pump 14 as possible, particularly upstream of the auxiliary distributor 23 and the filter 22, so as thus to gain the stress loss in these two elements.

If the cross-section S4 is selected to be equal to S3/2, the effective cross-section of this distributor subject to the pressure of the reducing valve is the same in both directions of movement: S4 in a displacement toward the left regulating a rising of the implement 13 (S3 is then in communication with the reservoir), and S3−S4=S4 in a displacement toward the right regulating descent of the implement 13 (S3 and S4 are then connected to the pressure of the reducing valve).

In another variation, the loss of flow pressure of the pump in the downward movements of the implement 13 can be remedied by selecting the effective cross-section of the distributor controlling the descent to be larger than the effective cross-section controlling the rise. In the case of FIG. 1, in which a chamber with a large cross-section has been arbitrarily provided which controls lowering of the implement, this amounts to saying that the cross-section S4 must be smaller than one-half of the cross section S3. But it is equally possible to place the chamber with the large cross-section at the right of the FIG. 1, and in this case, the cross-section S4 would have to be larger than one-half of the cross-section S3. In fact, it is possible to obtain control stresses which are identical in both directions, if the effective cross-sections S4 and S3–S4 are of the same ratio as the pressures available at the output of the reducing valve in the two directions of movement of the implements.

Figure 2:
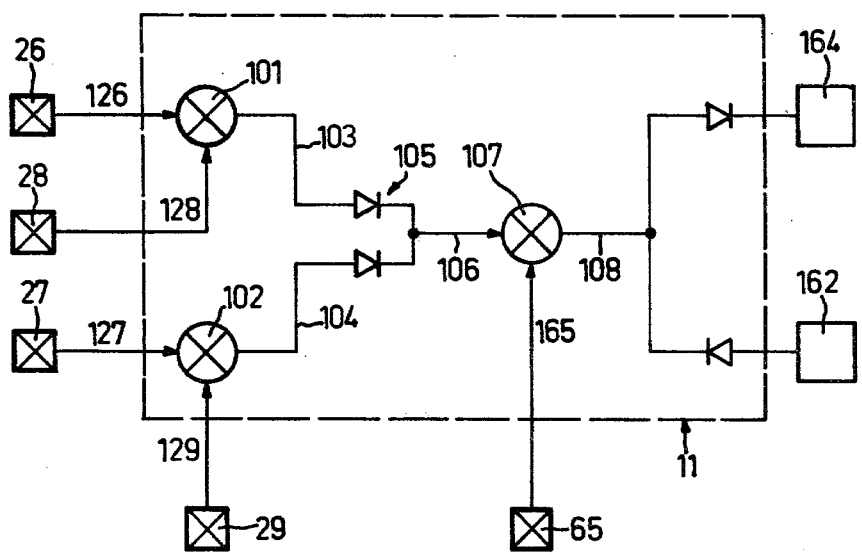
FIG. 2 is a diagram of the electronic control.

The electronic control 11 carries out the functions symbolized in FIG. 2. A first comparator 101 compares the electric signals 126 and 128 coming respectively from the pickups 26 and 28 verifying the desired position of the implement 13 and its actual position. The comparator 101 then delivers an electric signal 103 which is a function of the difference of the signals 126 and 128 and which thus represents the position error of the implements. A second comparator 102 compares the electric signals 127 and 129 coming respectively from the pickups 27 and 29 recording the desired tractive stress and the actual stress of the implement 13, and delivers a signal 104 which is a function of the difference between the signals 127 and 129 and thus represents the error of tractive stress on the implement 13. It will be assumed that the signal 104 is positive when the actual tractive stress is greater than that intended, that is, when a command to raise must be given in order to make correction. A third comparator 105 selects between the two error signals 103 and 104 that which corresponds to the greater command to raise, that is, the signal which is the most positive.

A signal 106 issuing from the comparator 105 thus represents a positioning order for the slide valve 30. A position pickup 65 (see also FIG. 1) detects the position of the slide valve 30, and a comparator 107 compares the preceding command signal 106 with the signal 165 coming from the position pickup 65, and its output 108 eventually amplified, excites one or the other of the electromagnets 164 or 162 (See also FIG. 1) according to its polarity, in order to cause the slide valve 30 to move in the appropriate direction so as to nullify the difference between the implement's actual position and its selected or desired position, as set by the levers 24 and 25.

Having been thus displaced in a direction which corresponds either to the position error of the implement, or to the traction error according to the signals 103 or 104, the slide valve 30 feeds oil to the jack 12 or to its discharge toward the reservoir until the actual position of the implements or the tractive stress corresponds to that intended.

It should be noted that the movement of the slide valve 30 in relation to its neutral position (immobile jack 12) is the greater, the larger the position error of the machines of the traction error, thus permitting a progressive and smooth correction.

Still quicker adjustment can be obtained by resetting the slide valve 30, when it is deflected from its set position, at a speed which is greater the larger the position error. In effect, the electrovalves 64 and 62 are of the type functioning all-out or not at all, which normally results in a movement at constant speed in one direction or in the other, or a standstill of the slide valve 30. However, this speed can be modulated by a control with rectangular signals having a variable cyclic ratio in a known manner, feeding said electrovalves by a sequence of constant frequency pulses, at a constant height but of variable width, this being easily achieved with electronic means.

The pickups 26, 27, 28, 29, and 65 may be of any known type. The pickup 29 in particular may advantageously comprise an assembly of strain gauges secured in the middle of the shaft 17 and in a position suitable for measuring the bending strain in that shaft, which strains are proportional to the algebraic sum of the stresses on each of the levers 16, be it tension stresses or compression stresses. For this purpose, the bearings 18 must preferably be of the swivel bearing type.

As a variation, the movement of the middle of the shaft 17 may be measured in a known manner. In this case, the presumed fixed support of the pickup 29 is fixed not on the chassis but preferably on the shaft 17 and near the bearings 18 so as to eliminate the influence of the play of the latter on the measuring.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. An electrohydraulic device for lifting agricultural implements comprising:
    a hydraulic jack,
    a hydraulic fluid reservoir,
    a pump with constant stroke-volume connected to said reservoir,
    a stepless distributor with a valve body having a slide valve therein and connected to said pump and connected to said jack via a check valve,
    a pressure regulator connected to the pump and to the distributor to regulate the fluid discharge pressure from the pump, said regulator being actuated by the pressure of the lifting jack,
    a downstroke return valve for descent of the implements, connecting said distributor to said reservoir,
    a relay valve means for connecting the piloting pressure of the regulator to the reservoir during downward movement of the implements,
    a flow reducing valve fed by the flow circuit of the pump in parallel with said distributor and said pressure regulator, and
    at least one piloting electrovalve fed by the reducing valve and connected to said distributor for determining the position of said slide valve.

2. A device in accordance with claim 1, wherein
    the slide valve and body of the stepless distributor define first and second control chambers at opposite ends of the valve,
    said first control chamber having a cross-sectional area substantially equal to one-half of that of the second said control chamber,
    said first control chamber fed directly by the fluid issuing from said reducing valve, and
    said slide valve including means for isolating said second control chamber from said reservoir in one position of said slide valve, means for placing it in communication with the reservoir in another position, and means for placing it in communication with the first chamber in a third position, depending on the conditon of said electrovalve.

3. A device in accordance with claim 2, having a spring normally urging said relay valve toward its seat, so that, during the downward movement of said implements, application of the piloting pressure of the regulator causing flow to the reservoir is done at a pressure that is low but is sufficient for the pump to feed the reducing valve.

4. A device in accordance with claim 2 wherein a cross-sectional area of one end of the slide valve of the main distributor is subjected to the pressure of the reducing valve in the direction of a command to lower the implements and wherein this cross-sectional area is greater than that at the other end of said valve subjected to the same pressure in the direction of a command to lift the implements.

5. A device in accordance with claim 1, wherein the reducing valve is fed starting from a point of the flow circuit of the pump located close to the latter and upstream of an auxiliary distributor.

6. A device in accordance with any one of claims 1–5, further comprising
   a first set of two electronic pickups on said device, one for signalling the desired position of said implement and the other its actual position,
   a second set of two additional pickups, one for signalling the desired tractive stress on the implement and the other the actual stress,
   a fifth pickup measuring the position of the slide valve of the distributor,
   electronic control means for controlling said distributor having
   a first comparator which compares the signals of the first set of pickups and signals the difference therebetween,
   a second comparator which compares the signals of the second set of pickups and signals the difference therebetween,
   a third comparator which determines between the output signals of the two first comparators the one which indicates the larger amount of lift of the implement,
   a fourth comparator comparing the signal from the fifth pickup with the output signal of the third comparator,
   the output of said fourth comparator exciting the electrovalve to so act that the difference between the signal of the fifth pickup and that of the third comparator tends to approach zero.

7. In an electrohydraulic device for lifting agricultural implements, said device comprising a hydraulic lifting jack having a hydraulic fluid reservoir, a constant stroke-volume pump connected to said reservoir,
   a stepless distributor with a valve body and a slide valve therein and connected to said pump and to said jack via a check valve, a pressure regulator piloted by the pressure at the lifting jack and connected to said pump to regulate its fluid discharge,
   a downstroke return valve for descent of the implements, connecting said distributor to said reservoir, and a relay valve means for connecting the piloting pressure of the regulator to the reservoir during downward movement of the implements, an improvement comprising the combination therewith of:
   a flow reducing valve fed by said pump in parallel with said distributor and said regulator,
   piloting electrovalve means for determining the position of the stepless distributor and fed by the reducing valve,
   said distributor having first and second control chambers at the opposite ends of the slide valve,
   said first control chamber having a cross-sectional area substantially equal to one-half of that of the second said control chamber,
   said first control chamber being directly connected to said reducing valve, and
   said slide valve having means for alternately isolating said second control chamber from said reservoir, for placing in communication with said reservoir, and for placing it in communication with the first chamber, depending on the condition of said electrovalve,
   a first electronic pickup for detecting and signalling the desired position of said implements,
   a second electronic pickup for detecting and signalling the actual position of said implements,
   a third electronic pickup for detecting and signalling the desired tractive stress on the implements,
   a fourth electronic pickup for detecting and signalling the actual stress on said implements,
   a fifth electronic pickup detecting and signalling the position of the slide valve of the distributor, and
   electronic control means for controlling said device and comprising
   a first comparator which compares the signals of said first and second pickups and puts out a difference signal,
   a second comparator which compares the signals of said third and fourth pickups and puts out a difference signal,
   a third comparator which determines between the difference signals of said first and second comparators that signal for indicating the larger amount of lift of the implements,
   a fourth comparator comparing the signal from the fifth pickup with the output signal of the third comparator, and
   actuating means actuated by said fourth comparator to actuate the electrovalve to cause the difference between the signal of the fifth pickup and that of the third comparator to approach zero.

8. A device for hydraulically lifting agricultural implements, comprising:
   a lifting jack,
   a pump with constant stroke volume connected by a fluid passageway to a stepless distributor,
   a flow pressure regulator of the pump piloted by the pressure of the lifting jack,
   downstroke valve means adapted to connect the distributor to a reservoir for lowering the implements,
   a relay valve means for connecting to the reservoir the piloting pressure of the regulator in the downward movement of the implements,
   a reducing valve fed by the flow circuit of the pump, and
   at least one pilot electrovalve of the stepless distributor fed by the reducing valve.

* * * * *